United States Patent [19]
Danek

[11] Patent Number: 5,873,437
[45] Date of Patent: Feb. 23, 1999

[54] SHOCK ABSORBER

[75] Inventor: Magnus Danek, Upplands Vasby, Sweden

[73] Assignee: Yamaha Hatsudoki Kabushiki Kaisha, Iwata, Japan

[21] Appl. No.: 232,677

[22] Filed: Apr. 25, 1994

[30] Foreign Application Priority Data

Apr. 23, 1993 [SE] Sweden .................................. 9301366

[51] Int. Cl.⁶ ......................................................... F16F 9/46
[52] U.S. Cl. ..................................... 188/282.2; 188/299.1; 188/312; 280/707
[58] Field of Search ................................ 188/279, 299.1, 188/311, 312, 314, 282.2; 280/707, 714

[56] References Cited

U.S. PATENT DOCUMENTS

| 4,655,440 | 4/1987 | Eckert ................................. 188/299 X |
| 4,722,548 | 2/1988 | Hamilton et al. ....................... 280/707 |
| 4,821,849 | 4/1989 | Miller ..................................... 188/280 |
| 4,936,423 | 6/1990 | Karnopp .................................. 188/299 |
| 4,986,393 | 1/1991 | Preukschat et al. ..................... 188/299 |
| 5,383,680 | 1/1995 | Bock et al. ......................... 280/707 X |

FOREIGN PATENT DOCUMENTS

| 0351537 | 1/1990 | European Pat. Off. . |
| 3742883 | 12/1987 | Germany ................................ 280/714 |

*Primary Examiner*—Peter M. Poon
*Attorney, Agent, or Firm*—Knobbe, Martens, Olson & Bear LLP

[57] ABSTRACT

A shock absorbing system wherein arrangements are provided for altering the hysteresis effects of the fluid utilized so as to obtain desired damping curves. Particularly, by employing different hysteresis effects it is possible to obtain larger damping forces at the end of the piston stroke. The hysteresis effect can be altered by changing the effective area of the shock absorber piston by controlling the flow paths between the piston chambers and an accumulator chamber and the pressures necessary to open these flow paths. In addition, by employing selectively openable variable volume chambers and variable pressure accumulator chambers, further changes in the hysteresis effect can be accomplished.

34 Claims, 3 Drawing Sheets

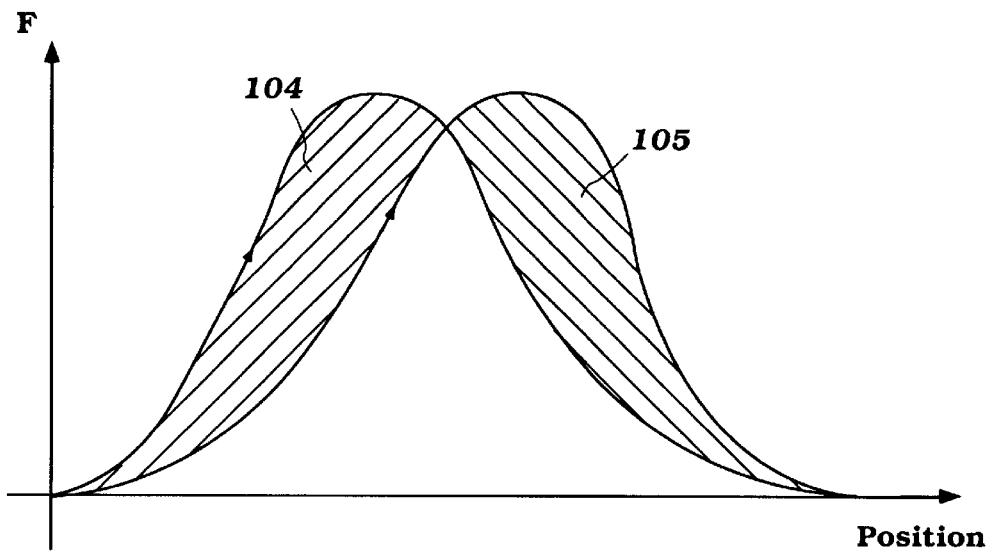
Figure 4
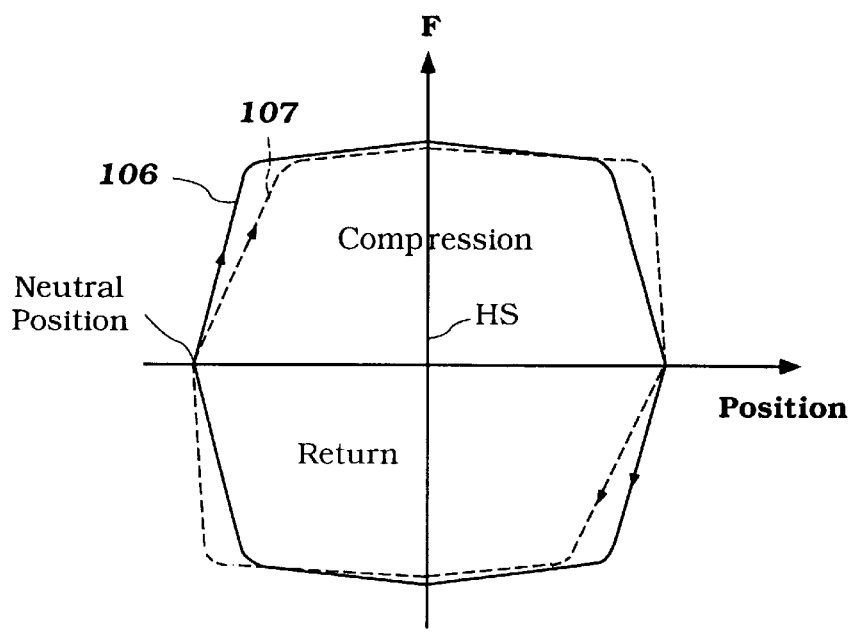
Figure 5
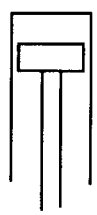 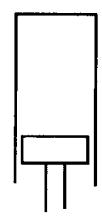
Figure 6  Figure 7

SHOCK ABSORBER

BACKGROUND OF THE INVENTION

This invention relates to a hydraulic shock absorber and more particularly to an improved hydraulic shock absorber for a vehicle suspension wherein the hysteresis effects of the compressibility of the fluid employed in the shock absorber can either be compensated for and/or employed to change the damping characteristics as desired.

The use of hydraulic shock absorbers for damping suspension travel in vehicle suspension systems are well known. Basically, these shock absorbers control the flow to or from at least one fluid chamber in order to vary the damping characteristics. Various arrangements have been provided also so that the damping characteristics can be adjusted during the vehicle travel. Although these systems are quite effective, they have not been able to accommodate for the fact that the hydraulic fluid, although generally considered as incompressible, is not in fact incompressible. This problem is particularly acute with shock absorbers that have relatively short strokes. It has been found that a large proportion of the suspension travel is due to the compression of the hydraulic fluid used in the system. Thus, even though the control of the damping during the normal operation is accurately controlled, the total shock absorber performance can be deteriorated considerably from that which is desired because of the fact that the suspension travel during the compression of the hydraulic fluid is basically uncontrolled.

The amount of compression of the hydraulic fluid and the damping force also depends upon the speed at which the suspension elements are relatively moving and this makes it further difficult to set the shock absorber to obtain the desired damping characteristics. The effect of the compressibility provides a hysteresis effect in the operation of the shock absorber which is well known. Since this hysteresis is not controllable with the prior art type of constructions, it cannot be employed to obtain the desired damping effect with conventional type shock absorbers.

One problem with the prior art type of shock absorbers, and particularly when used for extreme conditions where performance is extremely important, such as in racing vehicles, is that the damping at the end of the stroke cannot be effectively maintained at a high value so as to permit the desired suspension travel and still effective damping throughout the entire amount of movement. By utilizing the hysteresis effect and controlling it, it is possible to obtain high damping forces throughout the entire suspension travel or at desired positions in the suspension travel.

It is, therefore, a principal object of this invention to provide an improved hydraulic shock absorber.

It is a further object of this invention to provide a hydraulic shock absorber that permits control of the effect of the compressibility of the hydraulic fluid.

It is a further object of this invention to provide an improved shock absorber that permits adjustment and control of the hysteresis effect caused by the compressibility of the hydraulic fluid.

SUMMARY OF THE INVENTION

This invention is adapted to be embodied in a hydraulic shock absorber for a vehicle that is comprised of a pair of relatively movable members each adapted to be fixed to relatively movable components of a vehicle suspension system and defining a fluid chamber, the volume of which varies upon relative suspension movement of the components. A conduit is provided for transferring fluid to and from the chamber upon variations in the volume of the chamber. A damping arrangement is incorporated for controlling the rate of flow through the conduit for damping such suspension movement. In accordance with an important feature of the invention, means are provided for altering the damping rate to reflect the effects of compressibility of the fluid in the shock absorber.

One way in which the effective rate can be altered is by providing two different flow paths having different flow restrictions and selectively altering the flow direction. With a double acting piston type shock absorber, this can be done by controlling the flow paths in such a way as to control the effective area of the piston.

Another way in which the effect of compressibility can be utilized is by passing some of the fluid in an unrestricted path into a predetermined and preselected volume of an additional fluid to vary the amount of fluid subject to compression.

Another way in which the effect of compressibility can be utilized is by passing a portion of the flow into an accumulator chamber and by selectively varying the pressure in the accumulator chamber. The above described systems can be used either independently or in combination with each other.

BRIEF DESCRIPTION OF THE DRAWINGS

FIG. 4 is a graphical view showing the energy distribution during a working cycle of the shock absorber and how it can be varied.

FIG. 5 is a force distribution curve showing how the present invention can provide greater damping effect for a greater portion of the stroke.

FIG. 6 is a view showing the condition at the end of the stroke.

FIG. 7 shows the condition upon return to the portion at the beginning of the stroke.

DETAILED DESCRIPTION OF THE PREFERRED EMBODIMENTS OF THE INVENTION

Figure 1:
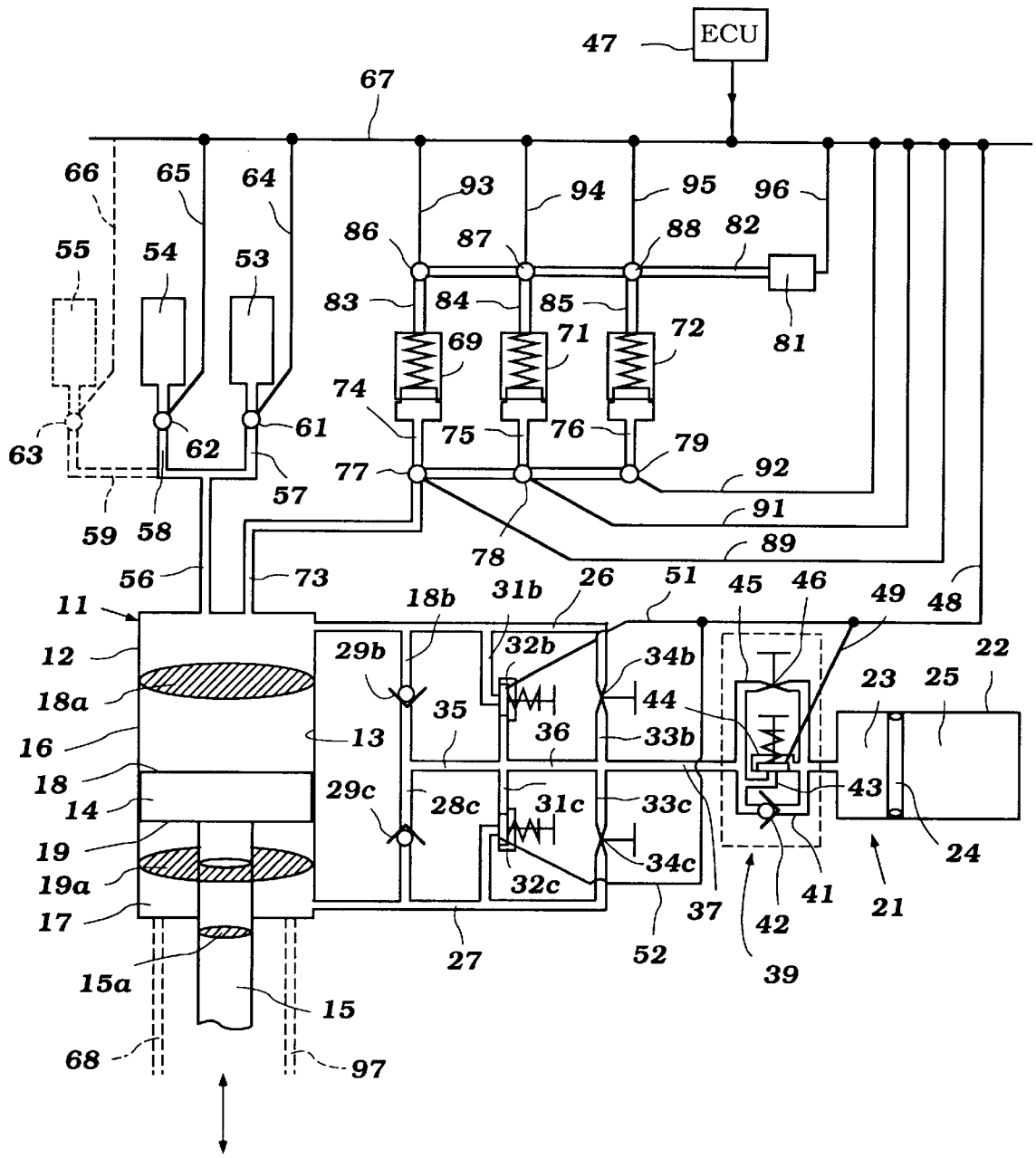
FIG. 1 is a partially schematic, partially cross-sectional view of a suspension system constructed in accordance with an embodiment of the invention and employing all of the various features for changing the hysteresis characteristics and/or compensating for the compressibility of the fluid.
Figure 2:
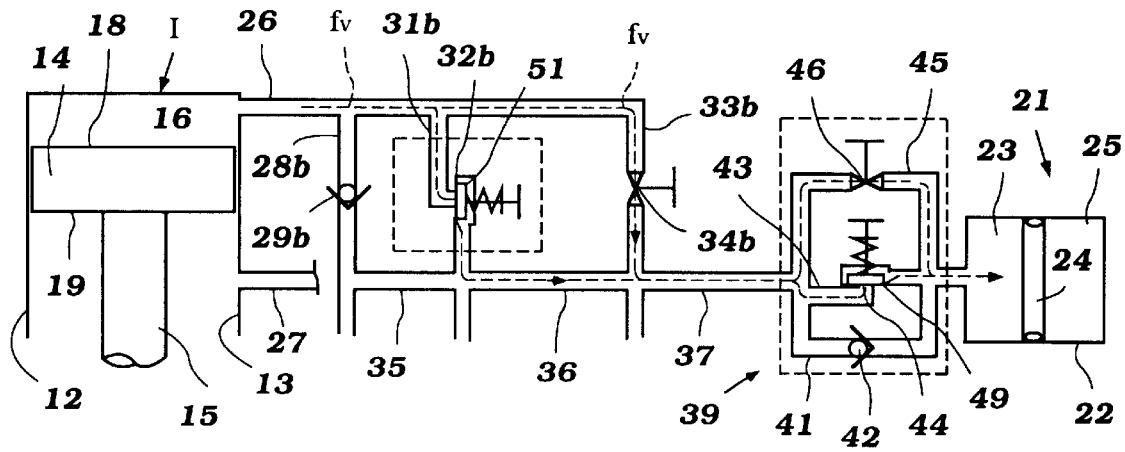
FIG. 2 is an enlarged partial view showing the flow condition during the one type of damping operation.

Referring first to FIGS. 1 and 2, a hydraulic shock absorber for a vehicles suspension system constructed and operated in accordance with an embodiment of the invention is shown in part in cross section and in part schematically. The hydraulic shock absorber includes a piston cylinder assembly, indicated generally by the reference numeral 11 which is comprised of an outer cylinder housing 12 that defines a cylinder bore 13 in which a piston 14 is supported for reciprocation. The cylinder 12 is adapted to be affixed in any known manner to a first component of a vehicle suspension system, for example the chassis or frame thereof. The piston 14 has rigidly affixed to it a piston rod 15 which extends to one end of the cylinder housing 12, through an appropriate seal and is adapted to be connected to another suspension component of the vehicle, such as the wheel suspending element. The manner of connection of the cylinder 12 and piston rod 15 to the vehicle suspension is well known in this art and any type of such known constructions may be employed.

The piston 14 has the effect of dividing the cylinder bore 13 into an upper chamber 16 and a lower chamber 17 with the piston rod 15 extending through the lower chamber 17. The piston 14 has an upper surface 18 that is exposed to the fluid in the chamber 16 and a lower surface 19 that is exposed to the fluid in the chamber 17. The area of the piston surface 18 effective in the chamber 16 is indicated at 18a in FIG. 1. Because of the condition of the piston rod 15 in the chamber 17 having a surface area 15a, the effective area of the piston under surface 19 is equal to the area 18a minus the area 15a or the area 19a as also shown in this figure.

A conduit arrangement, to be described, is provided for controlling the flow to and from the chambers 16 and 17 and also to an accumulator, indicated generally by the reference numeral 21. The accumulator 21 is comprised of an outer housing 22 that is partially filled with a hydraulic fluid 23 which is the same hydraulic fluid contained in the chambers 16, 17 and the interconnecting conduitry. A floating piston 24 is maintained in engagement with the hydraulic fluid 23 in the accumulator 21 by means of a pressurized inert gas 25 such as nitrogen filling the remainder of the accumulator chamber.

The shock absorbing system includes a damping and control valve arrangement of the type shown in my copending application of the same title, Ser. No. 08/163,071 filed Dec. 6, 1993 and assigned to the assignee hereof. The disclosure of that copending application is incorporated herein by reference but the damping arrangement will also be described herein.

The conduit for the flow to and from the chambers 16 and 17 includes a first conduit 26 that communicates with the chamber 16 and a second conduit 27 which communicates with the chamber 17. Branch conduits come off of the conduits 26 and 27 and since these conduits are the same except for the direction of flow, the conduits and flow controlling arrangement associated with the conduit 26 are identified with a suffix b while those associated with the conduit 27 are designated with the suffix c.

These branch conduits include a first conduit 28 in which a check valve 29 is positioned. The check valve 29 permits flow to the respective chamber 16 or 17 but not flow from that chamber through the respective branch passage 28b or 28c.

In addition, there is provided a further branch passage 31 in which a pressure responsive valve 32 is positioned. The pressure responsive valves 32b and 32c permit flow only from the chambers 16 and 17, respectively, when a predetermined pressure exists. This predetermined pressure may be adjusted either manually or automatically, in a manner which will be described. A final branch conduit 33 is provided in which a variable orifice 34 is positioned. The conduits 33b and 33c and variable orifices 34b and 34c permit flow in either direction and the amount of restriction to this flow can be adjusted by adjustment of the variable orifice 34b and/or 34c which may also be done either manually or automatically.

The branch conduits 28 and 31 are interconnected by a further conduit 35 and the branch conduits 31 and 33 are connected by a branch conduit 36. The branch conduits 35 and 36 communicate with each other and with a further conduit 37 which communicates with the accumulator 21 in a manner which will be described.

The construction as thus far described is a schematic of the system shown in my aforenoted copending application and the method of operation will be apparent from a review of that application. Briefly stated, however, if a force is applied to the piston rod as shown by the double-headed arrow 38 in a direction to cause the piston 14 to move upwardly and compress the fluid in the chamber 16, flow will occur from the chamber 16 through the conduit 26 and branch conduit 33b through the restricted orifice 34b. When sufficient pressure is generated so as to overcome the bias on the valve 32b in the branch conduit 31b, this valve will also open. The fluid passing through the conduits 31b and 33b can flow through the conduit 28c by opening of the check valve 29c and into the lower chamber 17. However, there is more fluid displaced from the chamber 16 than can be accommodated in the chamber 17 due to the displacement of the piston rod 15 and the excess flow will enter the accumulator chamber 23.

When the displacing force is removed, the piston 14 will move downwardly causing the fluid in the chamber 17 to be compressed. When this occurs, restricted flow will occur through the conduit 33 depending upon the restriction of the orifice 34c and through the conduit 31c when the pressure is sufficient to open the pressure responsive valve 32c. This flow then can return to the chamber 16 through the opening of the check valve 29b and opening of the conduit 28b. Since less fluid is displaced from the chamber 17 than required to make up that in the chamber 16, fluid will also flow from the accumulator chamber 23 to the piston chamber 16.

The construction as thus far described will have its performance deteriorated by the compressibility of the fluid employed in the system, as aforenoted. Also, the hysteresis effect will be fixed with this system and the prior art type of construction as thus far described cannot be adjusted or varied. Therefore, in accordance with a feature of the invention, there is provided a further control valve, indicated generally by the reference numeral 39 which is interposed in the conduit 37 which connects the conduits 35 and 36 to the accumulator chamber 23. The control valve 39 includes a first branch passage 41 in which a check valve 42 is provided. The check valve precludes flow from the conduit 37 to the accumulator chamber 23 but permits flow from the accumulator chamber 23 to the conduit 37.

A second branch passage 43 contains a controlled pressure responsive valve 44 which will open at a predetermined pressure, which can be adjusted either manually or automatically to permit flow from the conduit 37 to the accumulator chamber 23. The valve 44 will not permit reverse flow however under normal control operation.

A further branch conduit 45 containing an adjustable orifice 46 which can be controlled either manually or automatically extends between the conduit 37 and the accumulator 23 and it will permit flow in both directions at a rate set by the size of the orifice 46.

The valves 32b, 32c and 44 are preferably of the type which are biased toward their closed positions by a variable force accomplished by either an electromagnet, spring, or both. By employing an electromagnet, it is possible not only to vary the biasing force to set the pressure at which the respective valve 32b, 32c, or 44 opens, but in accordance with a feature of the invention also so as to selectively open either the valves 32b and/or 32c and/or 44 to in effect disable their normal operation, depending upon the type of effect to be obtained. By so controlling these valves, the effective area of fluid displaced by the piston 14 when it moves upwardly to compress the fluid in the chamber 16 can be varied so as to be either the area 18a or the area 15a.

The way in which this can be done will be now described by particular reference to FIG. 2 which shows a position of the piston 14 when it has been moved upwardly compressing fluid in the chamber 16. This indicates the condition when there is a force I exerted either downwardly on the cylinder body 12 or upwardly on the piston rod 15. Fluid is then displaced, as aforenoted into the conduit 26. As has been noted, either the valve 32b or the valve 44 may be disabled so as to hold that valve in an open position. Thus, if the valve 32b is held open then the fluid can freely pass through the conduit 31b as shown by the dotted arrow fv in FIG. 2 to pass through the conduits 36 and 37 and act upon the valve 44. Also, there will be flow through the conduit 33b as permitted by the setting of the orifice 34a as also shown by the arrows fv in FIGS. 2.

In addition to flowing through the valve 44 if the pressure is high enough to overcome the closing force, there will also be flow through the conduit 45 through the orifice 46 to the accumulator chamber 23. It should be also noted that at this time since the valve 32b is held open, fluid will also flow through the passageway 28c and check valve 29 to the chamber 17 below the piston 14. Thus, under this condition, there will be an amount of fluid displaced through the valve 39 equivalent to the effective area of the piston rod 15 (area 15a) and although a large volume of fluid will be displaced, the suspension characteristics will be determined by the small volume area which is displaced into the accumulator chamber 23. Hence, a hysteresis function determined by the compression of the volume of the fluid displaced by the piston rod 15 (15a) will be the effect of the system.

On the other hand, if the control valve 39 is disabled and the control valve 32 is permitted to operate normally, then before any flow can pass from the chamber 16 into the system, there will have to be opening of the valve 32b by the pressure and the flow through the restricted orifice 34b in the channel 33b. Since the control valve 39 is opened, then the system operates as a conventional type of shock absorber having an accumulator chamber and fluid will be displaced to the chamber 17 and to the accumulator chamber 23 without any resistance once the flow passes the valve 32b and the orifice 34b. Hence the effective area of the damping system is the area 18a of the total piston surface 18.

From the foregoing description it should be readily apparent that by disabling either the valves 32b or valve 44 the hysteresis effect can be changed. In addition, it is possible to permit both of the valves 32b or 44 to operate normally without either being disabled and in this event a still further hysteresis function can be achieved. It should be readily apparent that the same effects can be employed by controlling the valves 32c and the valve 44 so as to change the hysteresis effect on the lower portion of the assembly when the piston 14 is moving downwardly to compress fluid in the chamber 17.

As shown in FIG. 1, there is provided an electronic control module, indicated schematically at 47 which outputs signals indicated at i through conductors having a branch circuit 48 having individual wires 49, 51, and 52 that control the valves 44, 32b and 32c, respectively.

In addition to varying the hysteresis effect by changing the effective area of the piston 14 which displaces fluid through the damping system, there may also be provided an arrangement for changing the effective volume of fluid subject to compression. This is done by connecting the chamber 16 to another chamber or chambers without substantial restriction. The connection to such additional chambers of fixed or variable volume which can be opened or closed to suit the conditions. Such additional chambers are shown in FIG. 1 at 53, 54, and 55 although the actual number of such chambers can be varied as can the volume of each chamber, is desired and each communicates with the chamber 16 through a main conduit 56 and respective branch conduits 57, 58, and 59 and is filled with the same fluid as the chamber 16. Respective control valves 61, 62, and 63 are provided in the branch conduits to determine when and what volume will be compressed. The control valve 61, 62, and 63 are controlled by branch wires 64, 65, and 66, respectively, from a main wire harness 67. Each of the chambers 53, 54, and 55 may have the same or different volumes and by controlling the number of volumes which are employed there can be provided a wide variety of effective volumes which can be added to the volume of the chamber 16 without any restriction to flow and thus change the hysteresis curve by selectively opening the valves 61, 62, and/or 63. This, therefore, provides a further way in which the system can alter the hysteresis curve. Similar containers may also communicate with the chamber 17 through a conduit 68 which can take the same form as the chambers 53, 54, and 55 and, therefore is not shown, so as to control the hysteresis curve in the opposite direction.

In addition to providing for variable volume effect through the use of the chambers 53, 54, and 55, the system also has an arrangement for adjusting the hysteresis or compressibility effects by changing the effective compressibility of the fluid. This is done by providing one or more accumulator chambers 69, 71, and 72 which communicate with the chamber 16 through a main passageway 73 and branch passageways 74, 75, and 76 which communicate with the main passageway 73, control the flow to the accumulator chambers 69, 71 and 72. Valves 77, 78, and 79, respectively. The accumulator chambers 69, 71, and 72 may have different volumes and different fixed spring rates. Alternatively, the chambers may be pressurized from a fluid pump 81 that delivers fluid through conduits 82 and branch conduits 83, 84, and 85 via valves 86, 87, and 88, respectively, so as to vary the initial pressure and the effect of accumulator. The valves 77, 78, and 79 are controlled by branch wires 89, 91, and 92 from the controller 47 main harness 67 while the valves 86, 87, and 88 are controlled by branch wires 93, 94, and 95, respectively. A wire 96 operates the pump 87 so as to vary the pressure effect. In addition to these factors, the ECU 47 may control other components of the system, such as the variable orifices 34b, 34c, 46. Alternatively, any of these components can be set manually.

Pressure control chambers similar to the accumulator 69, 71, and 72 may also communicate with the lower piston chamber 17 through a conduit, indicated at 97.

Thus, it may be seen that the total damping characteristics of the shock absorber 11 can be very effectively controlled and hysteresis effects caused by the compressibility of the fluid can be controlled so as to select the actual hysteresis effect.

Figure 3:
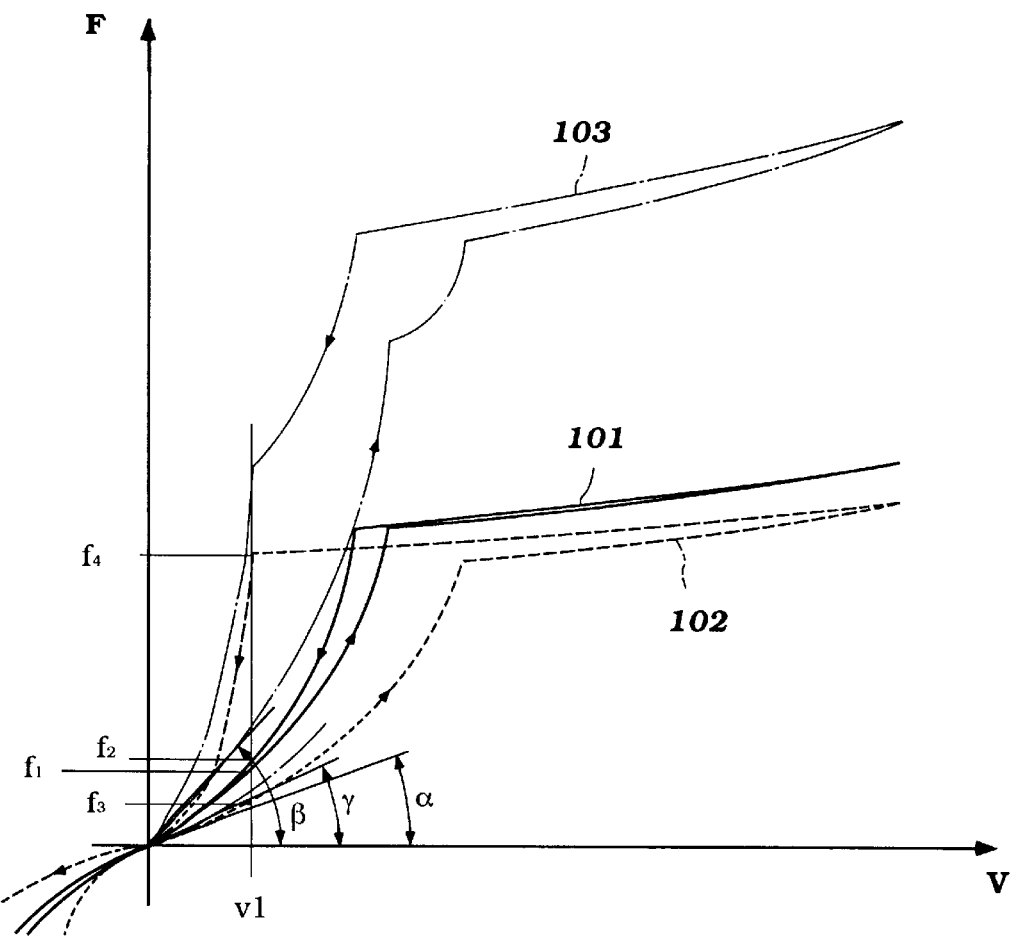
FIG. 3 is a graphical view showing how the damping curves and amount of hysteresis can be varied in accordance with the invention.

The effect of providing these various adjustments can be best understood by references to FIGS. 3–5. FIG. 3 is a curve showing the damping force F in relation to the rate of change of position of the piston 14 relative to the cylinder, i.e., its velocity indicated at V. The first curve shown by the solid lines and identified by the reference numeral 101 is the damping curve during acceleration and deceleration of the piston 14 to compress the fluid in the chamber 16 and then stop under the condition when the operation of the control valve 32b is normal and the valve 39 is deactivated. It will be seen that under this curve when the piston is moving upwardly during jounce at a velocity V1 the damping force will be f1 while upon deceleration a slightly higher damping force f2 will be achieved.

The broken line curve 102 shows the condition when the valve 32 is deactivated or opened and the valve 39 is operative. Under this condition, there will be a lower force f3 of damping on acceleration at the velocity V1 and a substantially larger force f4 upon deceleration at the end of the stroke due to the greater hysteresis in this mode of operation. This permits a high degree of damping through a greater amount of the piston travel.

The dot-dash curve 103 shows the effect when both the valves 32b and 39 are employed for damping and provides even greater damping forces. This curve is the sum of the curves 101 and 102. It should also be understood that the slope of the curves indicated by the angles α, β, and γ can be changed by changing the setting at which the various valves open. Of course, these characteristics can be changed during a single stroke as desired.

During situations wherein the piston 14 moves downwardly to compress the fluid in the lower chamber 17, for example, if the wheel passes over a hole in the road, the curves will be as shown in the lower left hand quadrant and will have a slightly different shape due to the difference in effective areas. As has been noted, the damping force can be actually changed by, for example, utilizing the fixed volumes 53, 54, and 55 or the accumulator volumes 69, 71, and 72.

FIG. 4 shows two such curves as may be obtained by varying these times showing the damping force in relation to the actual position of the piston 14 during its stroke. It may be seen that there are provided two areas 104 and 105 which can be shifted depending upon the form of the curve chosen.

FIG. 5 is a graphically view showing the position of the piston 14 in the cylinder 12 during a single cycle of compression and return movement and illustrates how the damping force can be increased, in accordance with the invention, toward the end of the stroke relative to a conventional type of shock absorber. The conventional shock absorber curve is shown by the solid line 106. That damping force is shown in vertical axis and it will be seen that as the piston begins to move, the damping force rapidly increases to a relatively high value and then builds up more slowly until the point of maximum piston velocity. As the piston then slows to approach the end of its stroke, the damping force drops off gradually and then as it moves to its final position, the damping force diminishes considerably. The damping on return is of the same character.

By employing the hysteresis function of the device in accordance with this invention, it is possible to generate a damping curve as shown by the broken line curve 107. It will be seen that the damping force at the beginning of the stroke does not build up as rapidly and thus permits a softer damping during initial suspension travel. The damping force reaches its peak at a point closer to maximum piston velocity than the conventional curve, but it will also be seen that this damping force can be maintained quite high through and until almost the end of the piston stroke. In a same manner, the return damping is also of this same curve and thus it is possible to maintain larger damping forces during a greater portion of the piston movement and particularly those times when a higher damping force is required.

FIG. 6 shows the position toward the end of piston travel and FIG. 7 shows the position just before return to the neutral position.

From the foregoing description it should be readily apparent that the described shock absorber and control arrangement permits not only the compensation in the shock absorber for the effects of hysteresis but also the use of the hysteresis to obtain desired damping functions and wherein the effective volume of the working fluid and the effect of its compressibility so as to achieve the effect of different effective spring lengths in the working media. Of course, the foregoing description is that of preferred embodiments of the invention and various changes and modifications may be made without departing from the spirit and scope of the invention, as defined by the appended claims.

I claim:

1. A hydraulic shock absorber for a vehicle comprising a pair of relatively movable members each adapted to be fixed relative to a respective relatively movable component of a vehicle suspension system and defining a fluid chamber the volume of which varies upon relative suspension movement of said components, a conduit for transferring fluid to and from said chamber upon variations in the volume of said chamber, a damping arrangement for controlling the rate of flow through said conduit for damping said suspension movement, and compensating means for altering the damping rate to reflect the effect of the compressibility of the fluid in said shock absorber.

2. The hydraulic shock absorber as defined by claim 1, wherein the compensating means changes the effective flow volume through the conduit.

3. The hydraulic shock absorber as defined by claim 2, wherein the effective flow volume is effected by changing the effective flow path through one of two selected flow paths.

4. The hydraulic shock absorber as defined by claim 3, wherein one of the effective flow paths is to a further fluid chamber and the other of the effective flow paths is to an accumulator chamber.

5. The hydraulic shock absorber as defined by claim 4, wherein the means for altering the damping rate permits the flow through both of the flow paths.

6. The hydraulic shock absorber as defined by claim 3, wherein one of the flow paths comprises a valved passage opened at a predetermined pressure and a parallel path containing an orifice.

7. The hydraulic shock absorber as defined by claim 6, wherein the other flow path also includes a valved passage opened at a predetermined pressure and a parallel path containing an orifice.

8. The hydraulic shock absorber as defined by claim 7, wherein either of the valved passages can be selectively opened to provide an unrestricted flow path.

9. The hydraulic shock absorber as defined by claim 2, wherein one of the relatively movable components comprises a cylinder defining a cylinder bore and the other of the relatively movable components comprises a piston reciprocating in the cylinder and connected by a piston rod to the suspension component.

10. The hydraulic shock absorber as defined by claim 9, wherein the piston rod passes through a second fluid chamber.

11. The hydraulic shock absorber as defined by claim 10, wherein the effective flow volume is effected by changing the effective flow path through one of two selected flow paths.

12. The hydraulic shock absorber as defined by claim 11, wherein one of the effective flow paths is to the second fluid chamber and the other of the effective flow paths is to an accumulator chamber.

13. The hydraulic shock absorber as defined by claim 12, wherein the compensating means permits the flow through both of the flow paths.

14. The hydraulic shock absorber as defined by claim 13, wherein one of the flow paths comprises a valved passage opened at a predetermined pressure and a parallel path containing an orifice.

15. The hydraulic shock absorber as defined by claim 14, wherein the other flow path also includes a valved passage opened at a predetermined pressure and a parallel path containing an orifice.

16. The hydraulic shock absorber as defined by claim 15, wherein either of the pressure responsive valves can be selectively opened to provide an unrestricted flow path.

17. The hydraulic shock absorber as defined by claim 10, further including means for providing a further path of fluid from the chamber which further path is undamped.

18. The hydraulic shock absorber as defined by claim 17, wherein the flow through the further path communicates with a closed volume of predetermined size.

19. The hydraulic shock absorber as defined by claim 18, wherein the further path is to any of several selected chambers of predetermined volume.

20. The hydraulic shock absorber as defined by claim 10, wherein the conduit further selectively connects the chamber with an accumulator chamber of predetermined pressure.

21. The hydraulic shock absorber as defined by claim 20, further including means for varying the pressure in the accumulator chamber.

22. The hydraulic shock absorber as defined by claim 21, wherein the means for varying the pressure in the accumulator chamber comprises means for exerting a predetermined fluid pressure in the accumulator chamber in opposition to the fluid pressure from the chamber.

23. The hydraulic shock absorber as defined by claim 20, wherein there are a plurality of accumulator chambers each selectively communicable with the chamber and each having a different pressure effect.

24. The hydraulic shock absorber as defined by claim 23, wherein at least one of the accumulator chambers may be subject to a variable pressure.

25. The hydraulic shock absorber as defined by claim 24, wherein the means for varying the pressure in at least one accumulator chamber comprises means for exerting a predetermined fluid pressure in the accumulator chamber in opposition to the fluid pressure from the chamber.

26. The hydraulic shock absorber as defined by claim 1, further including means for providing a further path of fluid from the chamber which further path is undamped.

27. The hydraulic shock absorber as defined by claim 26, wherein the flow through the further path communicates with a closed volume of predetermined size.

28. The hydraulic shock absorber as defined by claim 27, wherein the further path is to any of several selected chambers of predetermined volume.

29. The hydraulic shock absorber as defined by claim 1, wherein the conduit further selectively connects the chamber with an accumulator chamber of predetermined pressure.

30. The hydraulic shock absorber as defined by claim 29, further including means for varying the pressure in the accumulator chamber.

31. The hydraulic shock absorber as defined by claim 30, wherein the means for varying the pressure in the accumulator chamber comprises means for exerting a predetermined fluid pressure in the accumulator chamber in opposition to the fluid pressure from the chamber.

32. The hydraulic shock absorber as defined by claim 29, wherein there are a plurality of accumulator chambers each selectively communicable with the chamber and each having a different pressure effect.

33. The hydraulic shock absorber as defined by claim 32, wherein at least one of the accumulator chambers may be subject to a variable pressure.

34. The hydraulic shock absorber as defined by claim 33, wherein the pressure in at least one accumulator chamber is varied by means for exerting a predetermined fluid pressure in the accumulator chamber in opposition to the fluid pressure from the chamber.

\* \* \* \* \*